(12) United States Patent
Kida et al.

(10) Patent No.: US 11,340,724 B2
(45) Date of Patent: May 24, 2022

(54) DISPLAY DEVICE WITH TOUCH PANEL

(71) Applicant: SHARP KABUSHIKI KAISHA, Sakai (JP)

(72) Inventors: Kazutoshi Kida, Sakai (JP); Yasuhiro Sugita, Sakai (JP); Hiroshi Fukushima, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/407,842

(22) Filed: Aug. 20, 2021

(65) Prior Publication Data

US 2022/0075471 A1    Mar. 10, 2022

(30) Foreign Application Priority Data

Sep. 9, 2020    (JP) .................................. 2020-151238

(51) Int. Cl.
*G06F 3/041*    (2006.01)
*G02F 1/1333*    (2006.01)
*G06F 3/044*    (2006.01)

(52) U.S. Cl.
CPC ........ *G06F 3/0412* (2013.01); *G02F 1/13338* (2013.01); *G06F 3/044* (2013.01); *G06F 3/04166* (2019.05)

(58) Field of Classification Search
None
See application file for complete search history.

(56) References Cited

U.S. PATENT DOCUMENTS

2018/0143711 A1    5/2018    Ono
2018/0329257 A1*   11/2018   Xiao ................... G02F 1/13439

FOREIGN PATENT DOCUMENTS

JP    2009-069443 A    4/2009
JP    2017-027224 A    2/2017

* cited by examiner

*Primary Examiner* — Robin J Mishler
(74) *Attorney, Agent, or Firm* — ScienBiziP, P.C.

(57) ABSTRACT

A display device includes a backlight, a touch detection electrode disposed to overlap a display region in which an image is displayed in a plan view, and an electrically conductive reflective member disposed closer to the backlight than a plurality of touch detection electrodes. Reflective members are disposed to overlap at least some of the plurality of touch detection electrodes in a plan view, are configured to reflect light from the backlight, and segmented from each other in a plan view.

7 Claims, 18 Drawing Sheets

|  | FIRST EMBODIMENT | FIRST COMPARATIVE EXAMPLE | SECOND COMPARATIVE EXAMPLE |
|---|---|---|---|
| CAPACITY [F] | $5.29 \times 10^{-13}$ | $6.61 \times 10^{-13}$ | $5.24 \times 10^{-13}$ |
| REFERENCE RATIO | 100.95% | 126.00% | |

FIG. 9

|  | SECOND EMBODIMENT | SECOND COMPARATIVE EXAMPLE |
|---|---|---|
| CAPACITY [F] | $5.21 \times 10^{-13}$ | $5.24 \times 10^{-13}$ |
| REFERENCE RATIO | 103.10% | |

FIG. 12

DISPLAY DEVICE WITH TOUCH PANEL

CROSS-REFERENCE TO RELATED APPLICATIONS

This application claims the benefit of priority to Japanese Patent Application Number 2020-151238 filed on Sep. 9, 2020. The entire contents of the above-identified application are hereby incorporated by reference.

BACKGROUND

Technical Field

The disclosure relates to a display device with a touch panel.

A liquid crystal display device provided with black masks to prevent light of the backlight from leaking from the outside of the pixel area is known in the related art (e.g., JP 2009-69443 A). The black masks of the liquid crystal display device disclosed in JP 2009-69443 A are made of a metal (conductor) that reflects light from the backlight.

In addition, a display device with a touch panel having an in-cell touch panel in which touch sensor electrodes are provided on a substrate is known in the related art (e.g., JP 2017-27224 A). In the display device with a touch panel disclosed in JP 2017-27224 A, black matrices (black masks) are provided closer to the backlight than the touch sensor electrodes.

SUMMARY

Here, the black masks of the in-cell touch panel as disclosed in JP 2017-27224 A are generally made of a resin (non-conductor). Therefore, in order to improve usage efficiency of light from the backlight, a configuration in which the black masks disclosed in JP 2017-27224 A are made of a metal (conductor), like the black masks disclosed JP 2009-69443 A, or a configuration in which a metal reflective member is provided on the backlight side of the black masks is conceivable. Hereinafter, a metal black mask and a metal reflective member will be called an "electrically conductive reflective member" without distinguishing one from the other.

However, in a case in which an electrically conductive reflective member is provided in the touch panel, the conductive reflective member and the touch sensor electrodes are subject to capacitive coupling. For this reason, capacitive coupling occurs between a touch sensor electrode and another touch sensor electrode via the electrically conductive reflective member, and a CR time constant (the time required to charge the touch sensor electrodes) increases. As a result, there is a problem that performance of detecting a touch of a user's finger or the like decreases.

The disclosure has been conceived in order to solve the problems described above and aims to provide a display device with a touch panel capable of maintaining or improving touch detection performance even when an electrically conductive reflective member is provided.

To solve the above-described problems, a display device with a touch panel according to an aspect of the disclosure is a display device with a touch panel including a backlight and a touch panel configured to display an image using light from the backlight and detect a touch of a user, in which the display device with a touch panel includes a plurality of touch detection electrodes disposed to overlap a display region in which an image is displayed in a plan view and an electrically conductive reflective member disposed closer to the backlight than the plurality of touch detection electrodes, disposed to overlap at least some of the plurality of touch detection electrodes in a plan view of the touch panel, and configured to reflect light from the backlight, and the electrically conductive reflective member is segmented into a plurality of portions in a plan view of the touch panel.

In the display device with a touch panel having the above-described configuration, the electrically conductive reflective member is segmented into a plurality of portions in a plan view of the touch panel, and thus capacitive coupling between the plurality of touch detection electrodes via the electrically conductive reflective member can be reduced. As a result, a CR time constant of the touch detection electrodes (the time taken until the touch detection electrodes are charged) can be reduced even when the electrically conductive reflective member is provided, and thus touch detection performance can be maintained or improved.

BRIEF DESCRIPTION OF DRAWINGS

The disclosure will be described with reference to the accompanying drawings, wherein like numbers reference like elements.

FIG. 9 is a diagram for describing the comparison results of the first embodiment, the first comparative example, and the second comparative example.

FIG. 12 is a diagram for describing simulation results of the second embodiment.

DESCRIPTION OF EMBODIMENTS

Figure 1:
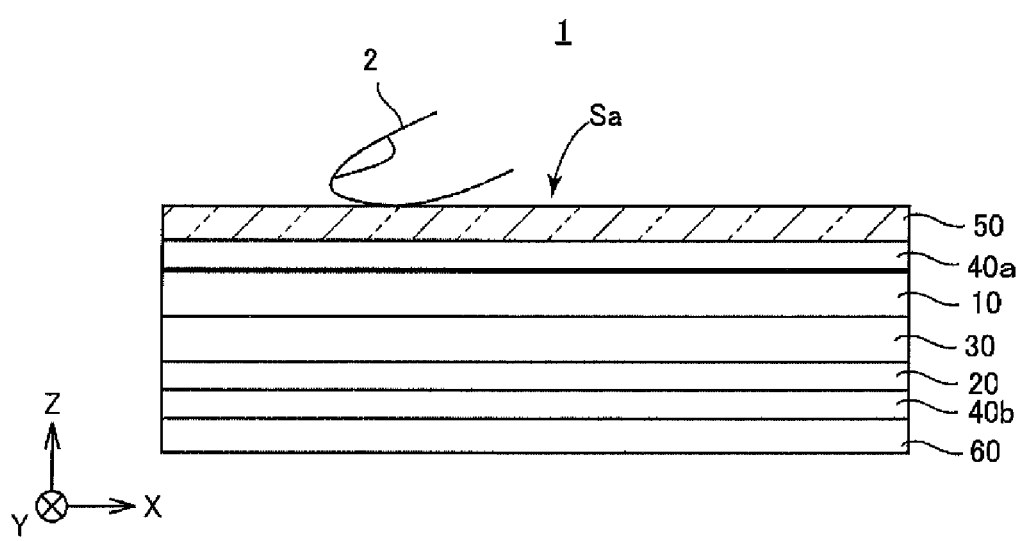
FIG. 1 is a schematic cross-sectional view of a display device (a display device with a touch panel) according to a first embodiment.

Hereinafter, embodiments of the disclosure will be described in detail with reference to the drawings. In the drawings, identical or corresponding parts are denoted by the same reference signs, and the description thereof will not be repeated.

First Embodiment

FIG. 1 is a schematic cross-sectional view of a display device 1 (a display device with a touch panel) according to a first embodiment. The display device 1 includes an active matrix substrate 10, a counter substrate 20, and a liquid crystal layer 30 interposed between the active matrix substrate 10 and the counter substrate 20 as a display panel (touch panel) as illustrated in FIG. 1. In addition, a pair of polarizers 40a and 40b are provided to sandwich the active matrix substrate 10 and the counter substrate 20 therebetween. Further, cover glass 50 is provided on a surface of the polarizer 40a via an adhesive layer (not illustrated), and a backlight 60 is provided to face the polarizer 40b.

The backlight 60 includes, for example, a light source including an LED, a light guide plate, and an optical sheet (none of which is illustrated). The light source is provided, for example, at a position at which the light source does not overlap a display region of the display panel in a plan view. The light guide plate is made of a transparent synthetic resin, for example, an acrylic resin, a polycarbonate, or the like, and is provided at a position at which the light guide plate overlaps the display region in a plan view. The optical sheet includes a diffuser sheet made of a substantially transparent synthetic resin, or the like that diffuses light and is provided between the display panel and the light guide plate.

The display device 1 allows a user to visually recognize an image from a surface (hereinafter, a touch surface) Sa side of the cover glass 50 provided on the polarizer 40a side and receives touch operations from, for example, a finger 2 or the like on the touch surface Sa.

The display device 1 employs a transverse electric field drive method as a method of driving liquid crystal molecules included in the liquid crystal layer 30. In order to realize the transverse electric field drive method, a pixel electrode and a counter electrode (common electrode) for forming an electric field are formed on the active matrix substrate 10. In addition, an element needed to detect a touch position is provided on the active matrix substrate 10. In other words, the display device 1 is a display device with a so-called in-cell touch panel.

Figure 2:
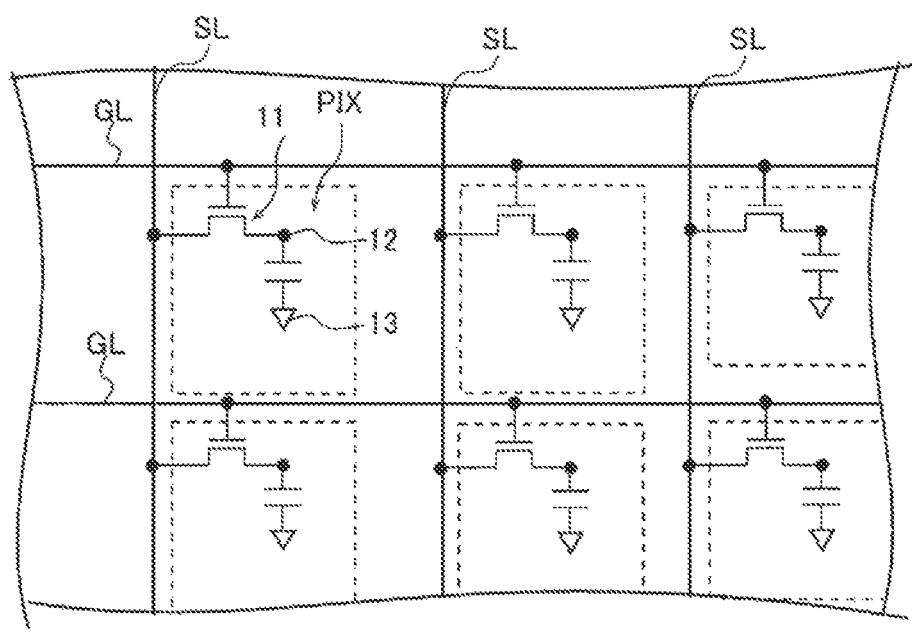
FIG. 2 is a circuit diagram illustrating a schematic configuration of pixels.

FIG. 2 is an equivalent circuit diagram of pixels in the active matrix substrate 10. The active matrix substrate 10 includes a plurality of gate lines GL and a plurality of data lines SL intersecting the plurality of gate lines GL. The active matrix substrate 10 has a display region including a plurality of pixels PIX defined by the plurality of data lines SL and the plurality of gate lines GL. A thin film transistor (TFT) 11, a pixel electrode 12, and a touch detection electrode 13 (counter electrode) are provided in each pixel PIX. The gate of the TFT 11 is connected to a gate line GL, the source of the TFT 11 is connected to a data line SL, and the drain of the TFT is connected to the pixel electrode 12. The pixel electrode 12 is formed of, for example, a transparent conductive film made of ITO, or the like.

Figure 3:
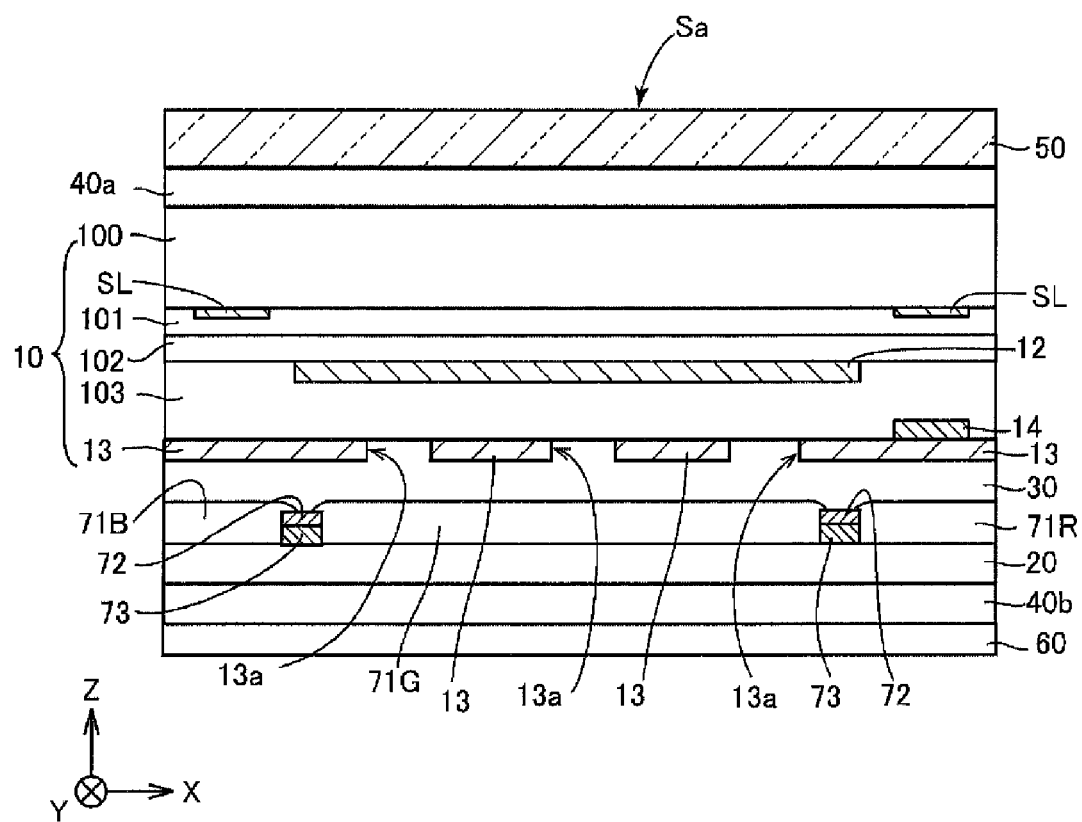
FIG. 3 is a cross-sectional view of a display panel (touch panel) according to the first embodiment.

FIG. 3 is a cross-sectional view of the display panel (touch panel) along an X-Z plane. The touch detection electrodes (counter electrodes) 13 are disposed to overlap the pixel electrode 12 in a plan view, and slits 13a of the touch detection electrodes (counter electrodes) 13 for forming a transverse electric field between the touch detection electrode and the pixel electrode 12 are provided at positions at which the slits overlap the pixel electrode 12 in a plan view (when viewed in the negative direction of the Z axis).

Figure 4:
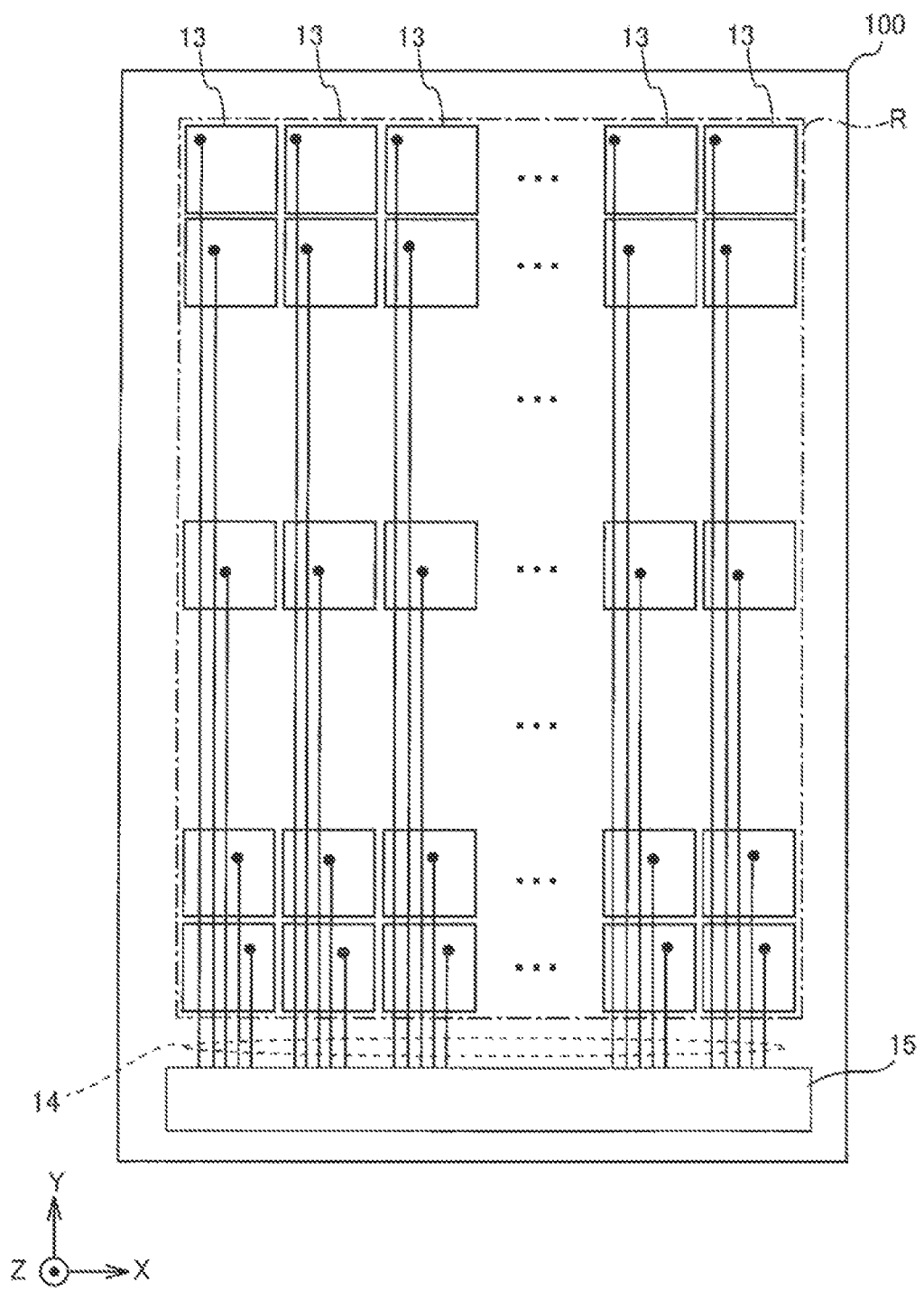
FIG. 4 is a schematic plan view for describing disposition of touch detection electrodes according to the first embodiment.

FIG. 4 is a schematic diagram illustrating a disposition example of the touch detection electrodes 13 provided in the active matrix substrate 10. The plurality of touch detection electrodes 13 are disposed in a matrix shape in a display region R as illustrated in FIG. 4. One touch detection electrode 13 overlaps a plurality of pixels PIX (see FIG. 2) in a plan view. Further, one touch detection electrode 13 is connected to one sensor wiring line 14. Each sensor wiring line 14 is connected to a controller 15 provided on the substrate 100. The controller 15 controls a potential of the touch detection electrodes 13 via the sensor wiring lines 14.

In addition, although not illustrated, the active matrix substrate 10 includes a display control circuit, a gate driver, and a source driver. The display control circuit supplies a control signal such as a synchronization signal (a vertical synchronization signal or a horizontal synchronization signal) indicating timing at which a clock signal or an image is to be written to the gate driver and the source driver. The gate driver sequentially applies a scanning voltage to the plurality of gate lines GL. The source driver applies a data voltage indicating a gray scale of a display image to a data line SL, based on a control signal.

The controller 15 applies a constant voltage to all of the touch detection electrodes 13 to display an image, and applies a pulse voltage for touch detection to all of the touch detection electrodes 13 when a touch is to be detected. The display device 1 performs image display and touch detection in one frame period in a time dividing manner.

Each of the touch detection electrodes 13 has a parasitic capacitance while the finger 2 of the user is not in contact with the touch surface. When the finger 2 is in contact with the touch surface, a capacitance is formed between the touch detection electrode 13 and the finger 2 near the contact position, and thus the capacitance of the touch detection electrode 13 changes. Then, a sensing signal according to the capacitance of the touch detection electrode 13 is output to the controller 15 via the sensor wiring line 14.

Figure 5:
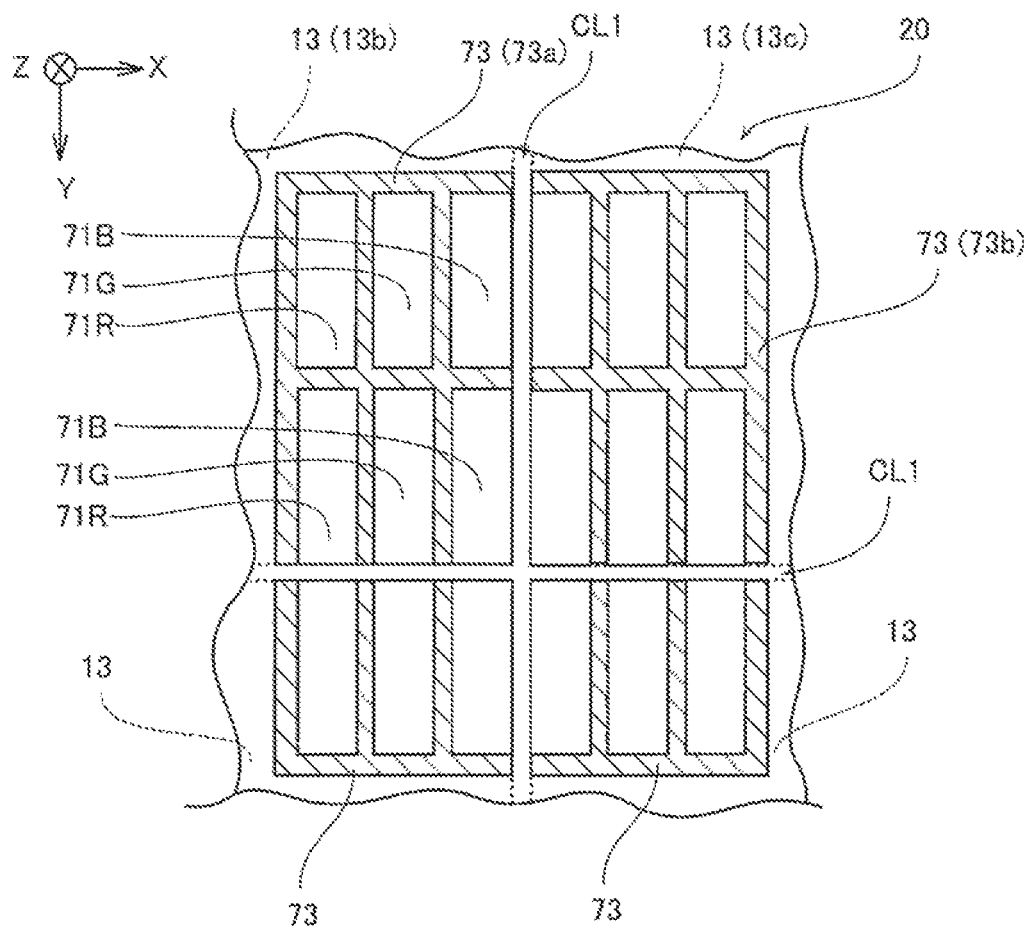
FIG. 5 is a schematic plan view for describing a configuration of a reflective member according to the first embodiment.

FIG. 5 is a diagram illustrating the counter substrate 20 in a plan view. The counter substrate 20 has red (R) color filters 71R, green (G) color filters 71G, and blue (B) color filters 71B disposed to overlap each of the pixels PIX (see FIG. 2) in the display region in a plan view. Each pixel PIX corresponds to the color of any of red (R), green (G), and blue (B). Further, the counter substrate 20 has black matrices 72 (see FIG. 3) and reflective members 73 between adjacent pixels PIX and in a region other than the pixels PIX.

In the first embodiment, the black matrices 72 are disposed between each of the color filters 71R, 71G, and 71B and are disposed to surround the color filters 71R, 71G, and 71B in a plan view as illustrated in FIG. 3. In addition, the black matrices 72 function to prevent light from the backlight 60 from leaking from the color filters 71R, 71G, and 71B. In other words, the black matrices 72 are made of a material having a light blocking property. For example, the black matrices 72 are made of a resin.

In addition, each reflective member 73 is formed on the surface of the black matrix 72 on the backlight 60 side (in the negative direction of the Z axis). In other words, the reflective members 73 are formed at positions at which the reflective members overlap the black matrices 72 in a plan view, and are formed to be integrated with the black matrices 72. In addition, the reflective members 73 are made of a metal. Although the reflective members 73 are made of aluminum in the first embodiment, the disclosure is not limited to this example. For example, the reflective members 73 may be made of a metal other than aluminum, such as silver.

In addition, in the present embodiment, the reflective members 73 are disposed closer to the backlight than the plurality of touch detection electrodes 13. Furthermore, the reflective members 73 are disposed to overlap at least some of the plurality of touch detection electrodes 13 in a plan view as illustrated in FIG. 5, and are configured to reflect light from the backlight 60. In other words, the reflective members 73 have a function of improving usage efficiency of light in the display device 1 by causing light from the backlight 60 to reflect toward the backlight 60, rather than causing the light to be absorbed by the black matrices 72.

In addition, the data lines SL are provided on the substrate 100 in the active matrix substrate 10 as illustrated in FIG. 3. Further, although not illustrated, the sources and the drains of the TFTs 11 and a semiconductor layer are provided on the substrate 100. The substrate 100 is made of a material having an insulating property and a light transmitting property, such as glass. Although the semiconductor layer is made of an oxide semiconductor containing indium (In), gallium (Ga), zinc (Zn), and oxygen (O), the disclosure is not limited to this example. The data lines SL are made of the same material as the sources and the drains. In the present embodiment, the data lines SL, the sources, and the drains are made of a metal material, for example, copper (Cu), aluminum (Al), or the like.

An insulating film 101 is provided on the data lines SL, and gate lines GL (see FIG. 2) and the gates of the TFTs 11 connected to the gate lines GL, which are not illustrated, are provided on the insulating film 101. The gate lines GL and the gates may be made of a metal material, for example, tantalum (Ta), aluminum (Al), or the like. An insulating film 102 is provided on the gate lines GL and the gates. The pixel electrode 12 is provided on the insulating film 102. Although the pixel electrode 12 is made of a transparent conductive film of, for example, ITO, in the first embodiment, the disclosure is not limited to this example.

An insulating film 103 is provided on the pixel electrode 12 as illustrated in FIG. 3. Then, a sensor wiring line 14 is provided on the insulating film 103 at a position at which the sensor wiring line overlaps a data line SL in a plan view. The sensor wiring line 14 is made of a metal material such as copper (Cu) or aluminum (Al). In addition, the touch detection electrodes 13 are provided on the sensor wiring line 14 and the insulating film 103. The touch detection electrodes 13 have a plurality of slits 13a at positions at which the slits overlap the pixel electrode 12 in a plan view. In the first embodiment, the touch detection electrodes 13 are made of a transparent conductive film of, for example, ITO, or the like.

The liquid crystal layer 30 is provided on the touch detection electrodes 13. Although not illustrated, a flattening film may be formed between the touch detection electrodes 13 and the liquid crystal layer 30. The counter substrate 20 (CF substrate) is disposed over the liquid crystal layer 30. The color filters 71B, 71G, and 71R are formed on the counter substrate 20 on the liquid crystal layer 30 side (in the positive direction of the Z axis). The black matrices 72 are formed between each of the color filters 71B, 71G, and 71R and around the color filters 71B, 71G, and 71R. The reflective members 73 are formed on the side of the black matrices 72 in the negative direction of the Z axis.

The polarizer 40b is provided on the counter substrate 20, and the backlight 60 is provided on the polarizer 40b as illustrated in FIG. 3.

The reflective members 73 are segmented into a plurality of portions in a plan view in the first embodiment as illustrated in FIG. 5. Specifically, boundaries (gap CL1) of the segmented reflective members 73 are provided at positions at which the boundaries overlap the boundaries (gap CL1) of the plurality of touch detection electrodes 13 in a plan view.

Figure 6:
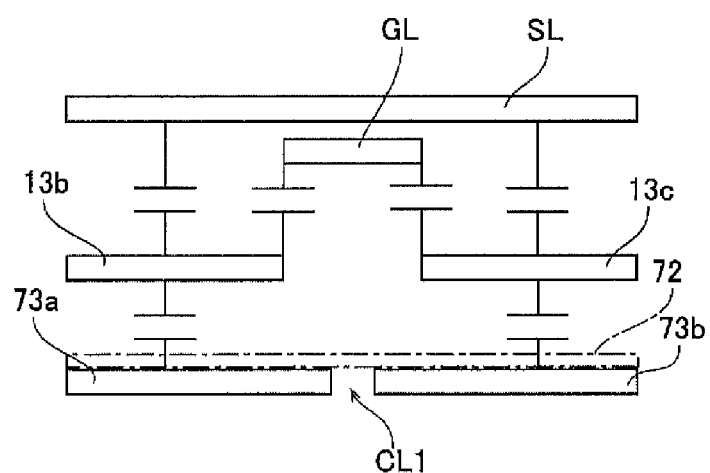
FIG. 6 is a diagram for describing capacitive coupling according to the first embodiment.

FIG. 6 is a schematic diagram for describing capacitive coupling between touch detection electrodes 13 and reflective members 73. Here, in FIG. 5, the touch detection electrode 13 in the negative direction of the X axis is denoted by 13b, and the touch detection electrode 13 in the positive direction of the X axis is denoted by 13c. In addition, the reflective member 73 in the negative direction of the X axis is denoted by 73a, and the reflective member 73 in the positive direction of the X axis is denoted by 73b. The data line SL is capacitive-coupled with each of the touch detection electrodes 13b and 13c as illustrated in FIG. 6. In addition, the gate line GL is capacitive-coupled with each of the touch detection electrodes 13b and 13c. The touch detection electrode 13b is capacitive-coupled with the reflective member 73a provided at a position at which the members overlap in a plan view. In addition, the touch detection electrode 13c is capacitive-coupled with the reflective member 73b provided at a position at which the members overlap in a plan view. Meanwhile, because the reflective member 73a capacitive-coupled with the touch detection electrode 13b and the reflective member 73b capacitive-coupled with the touch detection electrode 13c are segmented, capacitive coupling of the touch detection electrodes 13b and 13c is only a fringe capacitance component. For this reason, a total capacity can be equivalent to that in the case in which the reflective members 73 are not provided (see FIG. 8). This effect has been confirmed in the comparison results described below. Thus, even when the display device 1 is provided with an electrically conductive reflective member 73, the CR time constant of the touch detection electrodes 13 (the time taken until the touch detection electrodes 13 are charged) can be reduced, and thus touch detection performance can be maintained or improved.

In addition, the black matrices 72 are formed to cover the gap sections CL1 of the reflective members 73a and 73b as illustrated in FIG. 6. As a result, even when the reflective members 73 are segmented into a plurality of portions, the black matrices 72 can prevent light from leaking from the gap CL1 of the segmented reflective members 73.

Comparison Result of First Embodiment and First and Second Comparative Examples

Next, results of comparing the display device 1 according to the first embodiment with a display device 110 according to a first comparative example and a display device 120 according to a second comparative example will be described with reference to FIGS. 7 to 9. The display device 1 according to the first embodiment and the display device 110 according to the first comparative example are assumed to differ from each other only in the configuration of the reflective members, and assumed to be the same in configurations other than the reflective members. In addition, the display device 1 according to the first embodiment and the display device 120 according to the second comparative example are assumed to differ from each other only in terms of the presence or absence of the reflective members, and assumed to be the same in configurations other than the reflective members. Further, the display device 110 according to the first comparative example and the display device 120 according to the second comparative example are exemplified in order to explain the effects of the display device 1 according to the first embodiment, and the configuration of the display device 110 according to the first comparative example and the configuration of the display device 120 according to the second comparative example are not recognized as the related art.

Figure 7:
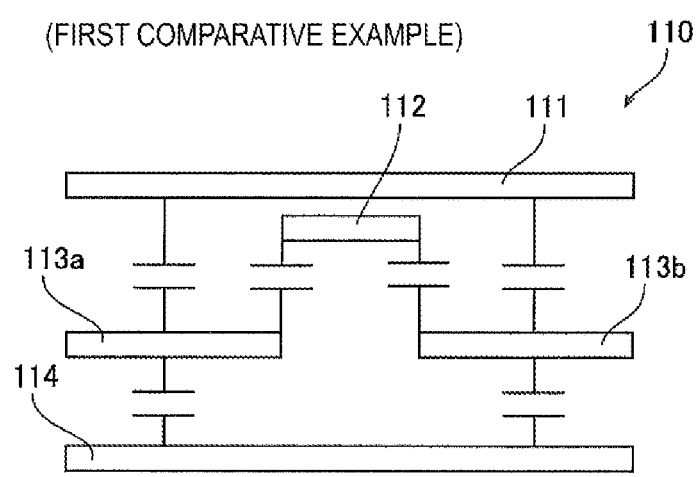
FIG. 7 is a diagram for describing a configuration of a display device according to a first comparative example.

FIG. 7 is a schematic view of the configuration of the display device 110 according to the first comparative example. The display device 110 according to the first comparative example is provided with a data line 111, a gate line 112, and touch detection electrodes 113a and 113b. In addition, the display device 110 according to the first comparative example is provided with a single reflective member 114 integrally formed as a whole.

Figure 8:
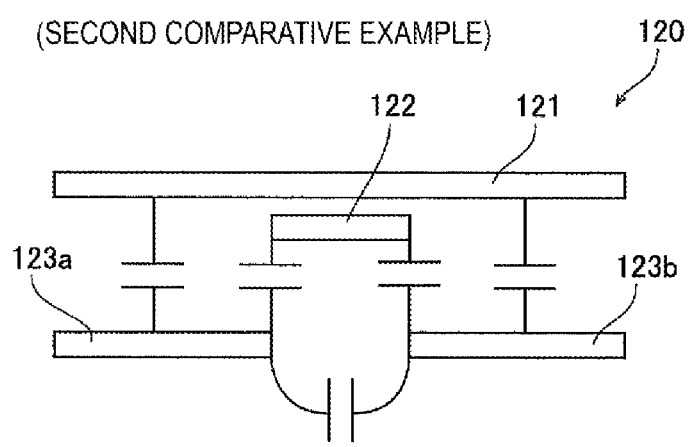
FIG. 8 is a diagram for describing a configuration of a display device according to a second comparative example.

FIG. 8 is a schematic view of the display device 120 with no reflective member according to the second comparative example. The display device 120 according to the second comparative example is provided with a data line 121, a gate line 122, and touch detection electrodes 123a and 123b, but provided with no reflective member.

FIG. 9 shows simulation results of the total capacity of each of the display device 1 according to the first embodiment, the display device 110 according to the first comparative example, and the display device 120 according to the second comparative example. The total capacity of the display device 1 according to the first embodiment was $5.29 \times 10^{-13}$ F. The total capacity of the display device 110 according to the first comparative example was $6.61 \times 10^{-13}$ F. The total capacity of the display device 120 according to the second comparative example was $5.24 \times 10^{-13}$ F.

According to the simulation results of FIG. 9, the proportion of the total capacity of the display device 1 according to the first embodiment was 100.95% (reference ratio) compared to the display device 120 with no reflective member according to the second comparative example. The proportion of the total capacity of the display device 110 according to the first comparative example was 126.00% (reference ratio) compared to the display device 120 with no reflective member according to the second comparative example. As a result, because the display device 110 according to the first comparative example is provided with the reflective member 114, the display device has a total capacity that is 1.26 times as great as that in the case in which the reflective member 114 is not provided, and the display device 1 according to the first embodiment provided with the reflective members 73 has a total capacity that is 1.01 times as great as that in the case in which no reflective members 73 were provided, and it was found that the capacity seldom changes. In other words, it was found in the first embodiment that the capacitive coupling between the touch detection electrodes 13 and the reflective members 73 is small and the touch detection performance can be maintained or improved even when the reflective members 73 are provided.

Second Embodiment

Next, a second embodiment will be described. Note that, in the following description, when the same reference numerals as in the first embodiment are used, the same configurations as in the first embodiment are indicated, and reference is made to the preceding description unless otherwise described.

Figure 10:
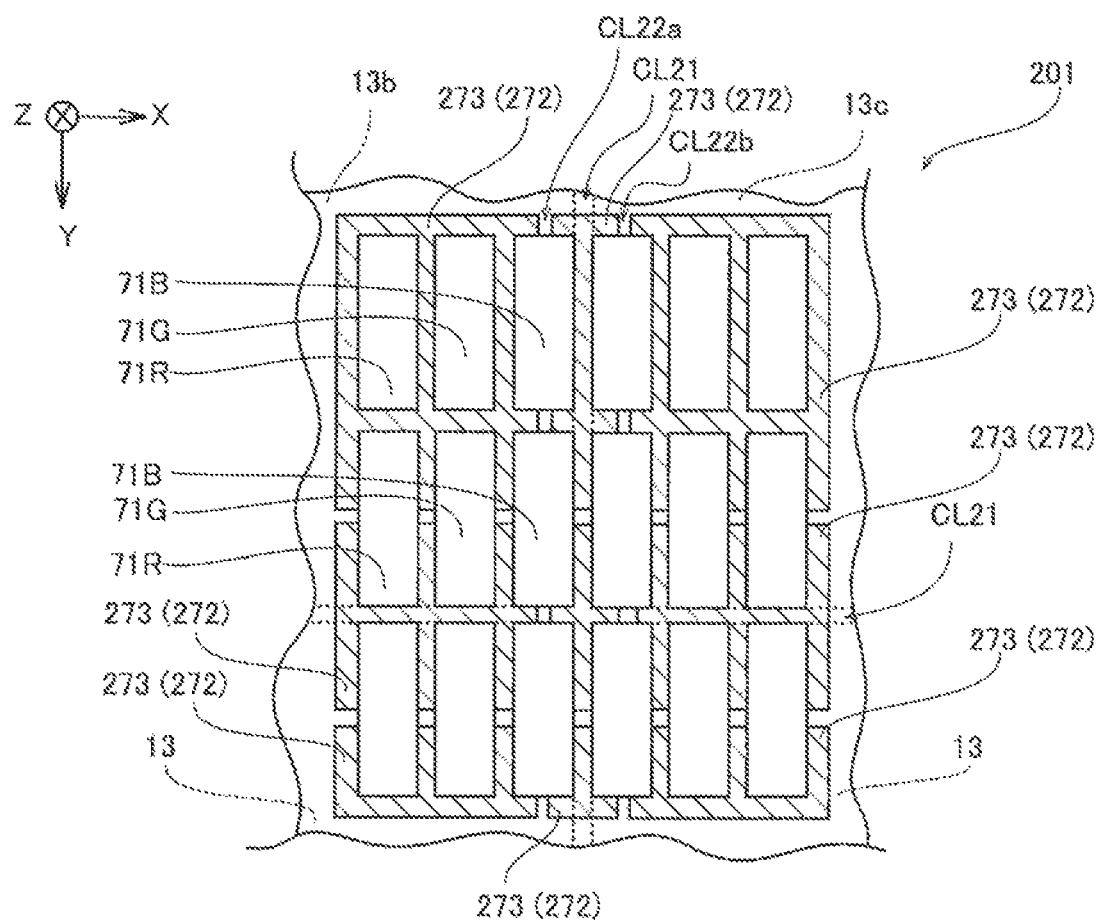
FIG. 10 is a plan view for describing a configuration of a display device according to a second embodiment.
Figure 11:
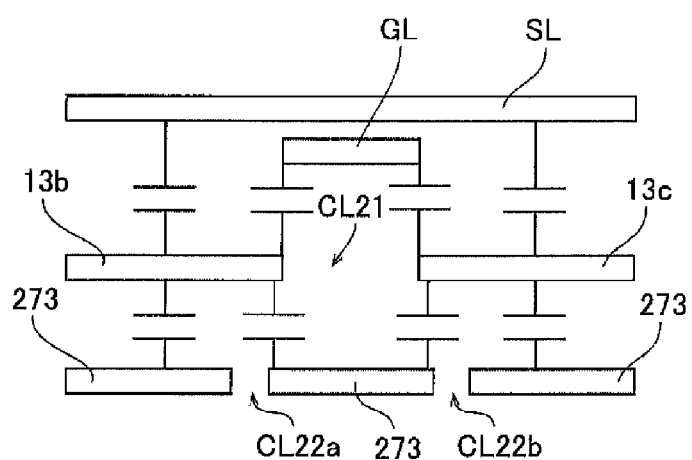
FIG. 11 is a diagram for describing capacitive coupling according to the second embodiment.

FIG. 10 is a plan view illustrating a configuration of a part of a display device 201 according to a second embodiment. In addition, FIG. 11 is a schematic diagram for describing capacitive coupling of the display device 201 according to the second embodiment. Different from the first embodiment in which the reflective members 73 are segmented at the positions at which the reflective members overlap the boundaries (CL1) of the touch detection electrodes 13 in a plan view, reflective members 273 are segmented at positions different from those of boundaries (CL21) of the touch detection electrode 13 in the second embodiment.

The reflective members 273 and the black matrices 272 are formed to straddle the boundary (gap CL21) between the touch detection electrodes 13b and 13c in a plan view as illustrated in FIGS. 10 and 11. In other words, at least a part of the gaps between the plurality of segmented reflective members 273 (CL22a and CL22b) and the boundary of the touch detection electrodes 13b and 13c are provided at different positions in a plan view.

Here, in a case in which the reflective members 73 are segmented at a position at which the reflective members overlap the boundary (CL1) of the touch detection electrodes 13 as illustrated in FIG. 6 of the first embodiment, the black matrix 72 is provided at the boundary of the touch detection electrodes 13. Meanwhile, the reflective members 73 may not be provided at the boundary of the touch detection electrodes 13. As a result, there may be a portion that does not reflect light in accordance with the boundary of the touch detection electrodes 13, and thus luminance unevenness is likely to be caused. On the contrary, in the second embodiment, at least a part of the gaps between the plurality of segmented reflective members 273 (CL22a and CL22b) is provided at different positions from that of the boundary between the touch detection electrodes 13b and 13c (positions at which color filters are provided), and thus light can be reflected at the boundary of the touch detection electrodes 13, and luminance unevenness can be curbed. Furthermore, because a region in which no reflective member 273 is present is provided to intersect the color filters 71R, 71G, and 71B in a plan view as illustrated in FIG. 10, the size of the regions in which no reflective members 273 are present can be reduced, compared to the case of FIG. 6. AS a result, luminance unevenness can be curbed in the second embodiment. Further, other configurations and effects of the second embodiment are similar to the configurations and effects of the first embodiment.

Simulation Results of Second Embodiment

Next, the simulation results according to the second embodiment will be described with reference to FIG. 12. The total capacity of the display device 201 of the second embodiment obtained in the simulation was $5.21 \times 10^{-13}$ F as shown in FIG. 12. In other words, it was found that the total capacity of the second embodiment was 103.10% (reference ratio) of the value ($5.24 \times 10^{-13}$ F) of the case in which no reflective member is provided (the second comparative example) and it is equivalent to the case in which no reflective member is provided.

Third Embodiment

Next, a third embodiment will be described. Further, in a case in which the same reference numerals as in the first or second embodiment are used in the following description, they represent the same configurations as in the first or second embodiment, and reference is made to the preceding description unless otherwise described.

Figure 13:
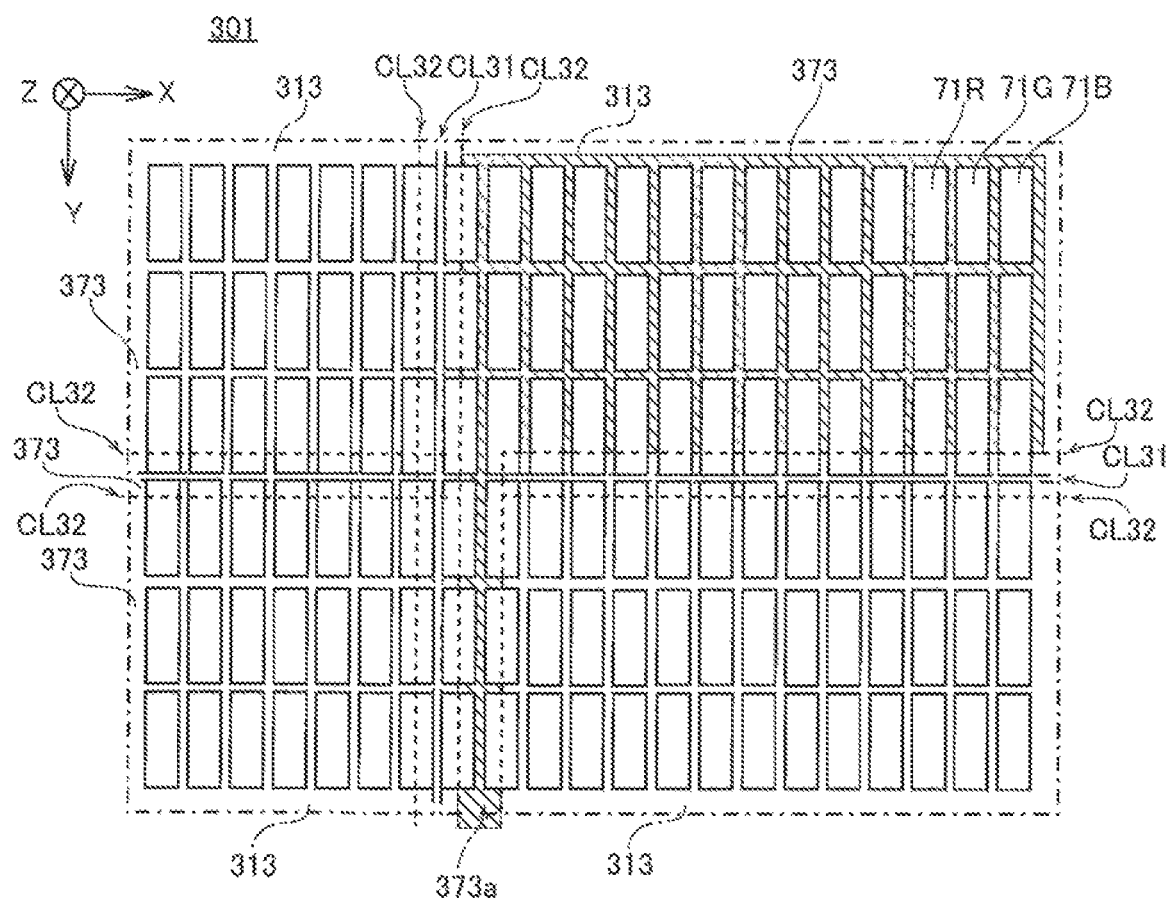
FIG. 13 is a plan view for describing a configuration of a display device according to a third embodiment.
Figure 14:
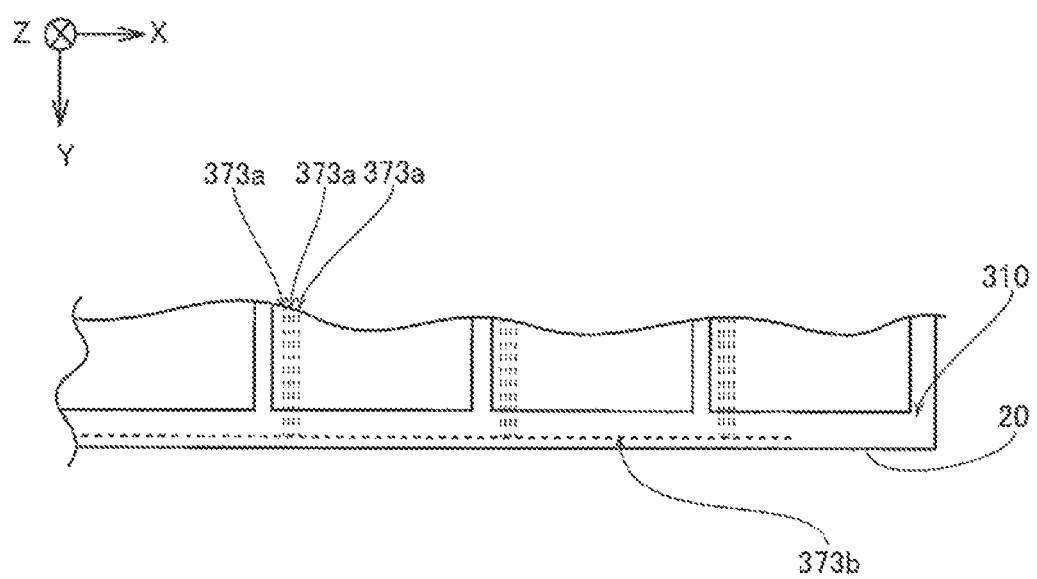
FIG. 14 is a plan view for describing a connection line and a connection part according to the third embodiment.

FIG. 13 is a plan view illustrating a configuration of a part of a display device 301 according to a third embodiment. In addition, FIG. 14 is a plan view for describing a frame part 310 of the display device 301 according to the third embodiment. In the third embodiment, segmented reflective members 373 are connected to the frame part 310 of the touch panel (counter substrate 20) via a connection line 373a as illustrated in FIGS. 13 and 14.

A plurality of touch detection electrodes 313 are disposed in a matrix shape with a gap CL31 in a plan view as illustrated in FIG. 13. Similar to the second embodiment, the reflective members 373 are segmented such that boundaries CL32 are formed (cut lines are provided) at positions different from that of the gap CL31 in a plan view. Then, each of the reflective members 373 has a connection line 373a connected to the frame part 310. In other words, cut lines (boundaries CL32) are formed such that the connection line 373a connected from each of the reflective members 373 to the frame part 310 is formed. Further, in order to emphasize the connection line 373a in FIG. 13, one reflective member 373 (connection line 373a) among the plurality of reflective members 373 is processed with hatching and illustrated.

A plurality of connection lines 373a connected to each of the plurality of reflective members 373 are connected to each other by a connection part 373b at the frame part 310 as illustrated in FIG. 14. Because the plurality of reflective members 373 are connected by the connection part 373b according to this configuration, local electrification on a transverse electric field-type display panel can be prevented.

Figure 15:
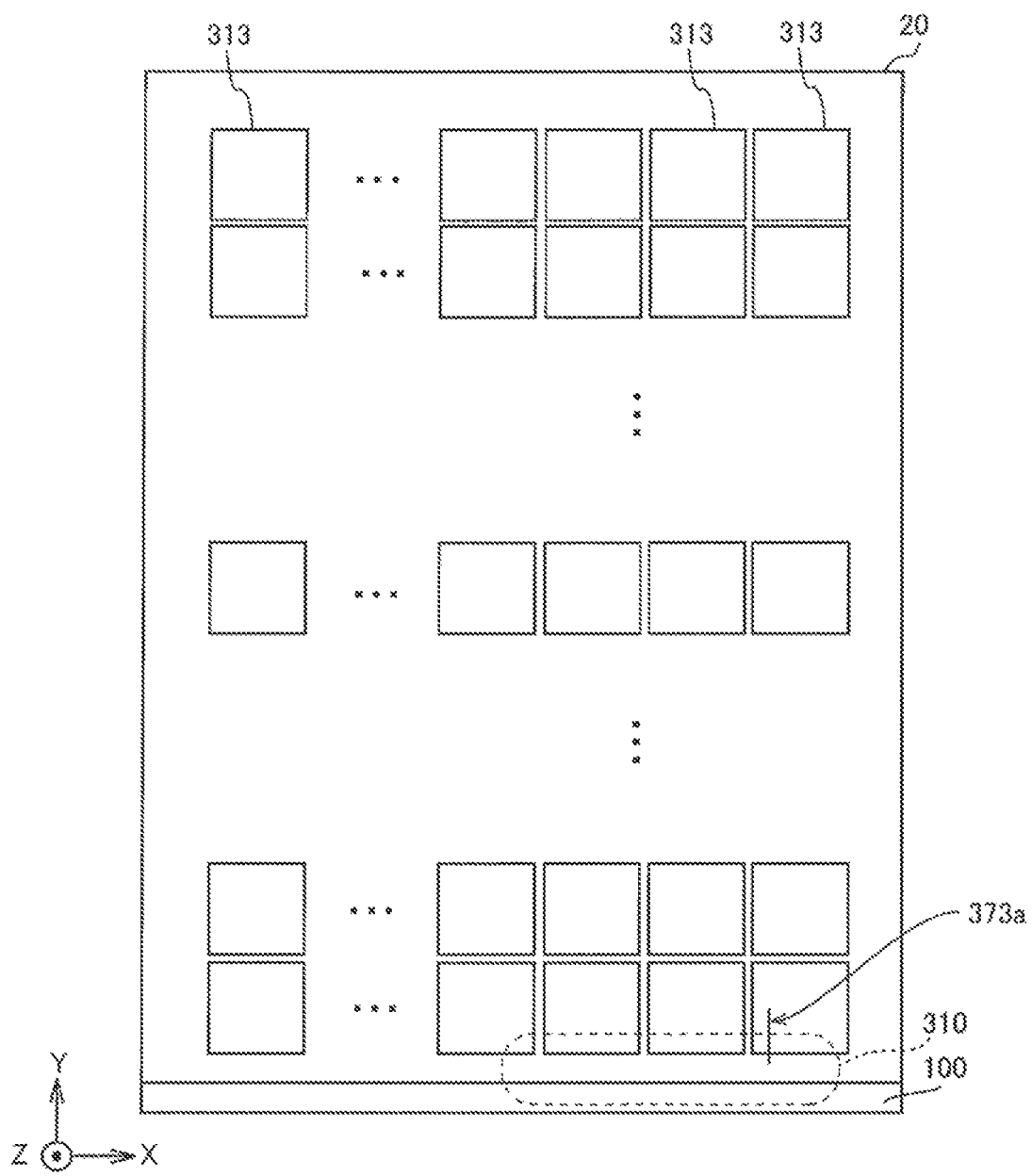
FIG. 15 is a plan view for describing a frame part according to the third embodiment.

FIG. 15 is a schematic plan view for describing the frame part 310. The frame part 310 in which the plurality of connection lines 373a are connected is frame part in which, for example, a flexible printed circuit (FPC) connection terminals (not illustrated) are provided in four frame parts of the display panel as illustrated in FIG. 15. Further, other configurations and effects of the third embodiment are similar to the configurations and effects of the first or second embodiment.

Modified Example of Third Embodiment

Figure 16:
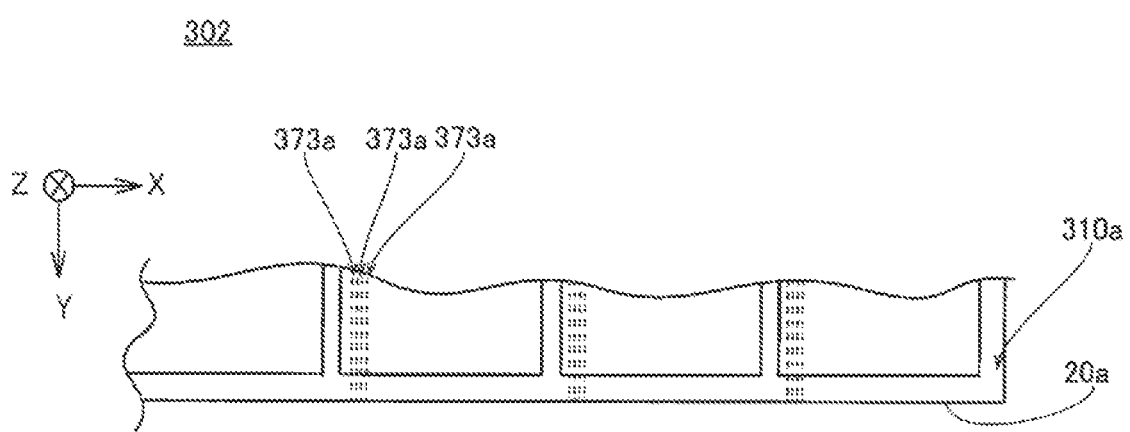
FIG. 16 is a plan view for describing a display device (connection line) according to a modified example of the third embodiment.

Next, a display device 302 according to a modified example of the third embodiment will be described with reference to FIG. 16. The display device 302 is not provided with the connection part 373b, and the plurality of connecting lines 373a are disposed in a state in which they are electrically disconnected from each other at a frame part 310a, unlike the display device 301 of the third embodiment. In other words, a counter substrate 20a is not provided with the connection part 373b and is cut further at the negative side of the Y axis, compared to the counter substrate 20 of the third embodiment as illustrated in FIG. 16. Because the reflective members 373 are disconnected from each other according to this configuration, it is possible to further reduce a load of the touch detection electrodes 313 (capacitive coupling between the touch detection electrodes 313 and the reflective members 373).

Fourth Embodiment

Next, a fourth embodiment will be described. Further, in a case in which the same reference numerals as those of any of the first to third embodiments are used in the following description, they represent similar configurations to those of any of the first to third embodiments, and reference is made to the preceding description unless otherwise described.

Figure 17:
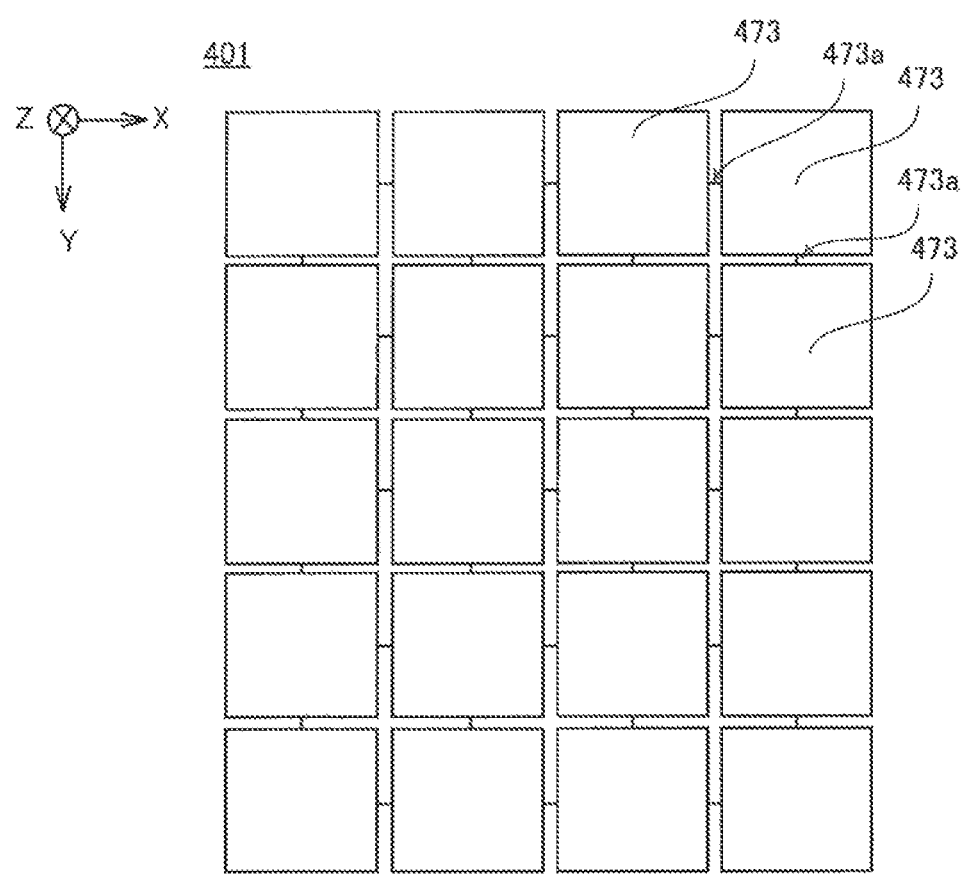
FIG. 17 is a plan view for describing a display device according to a fourth embodiment.
Figure 18:
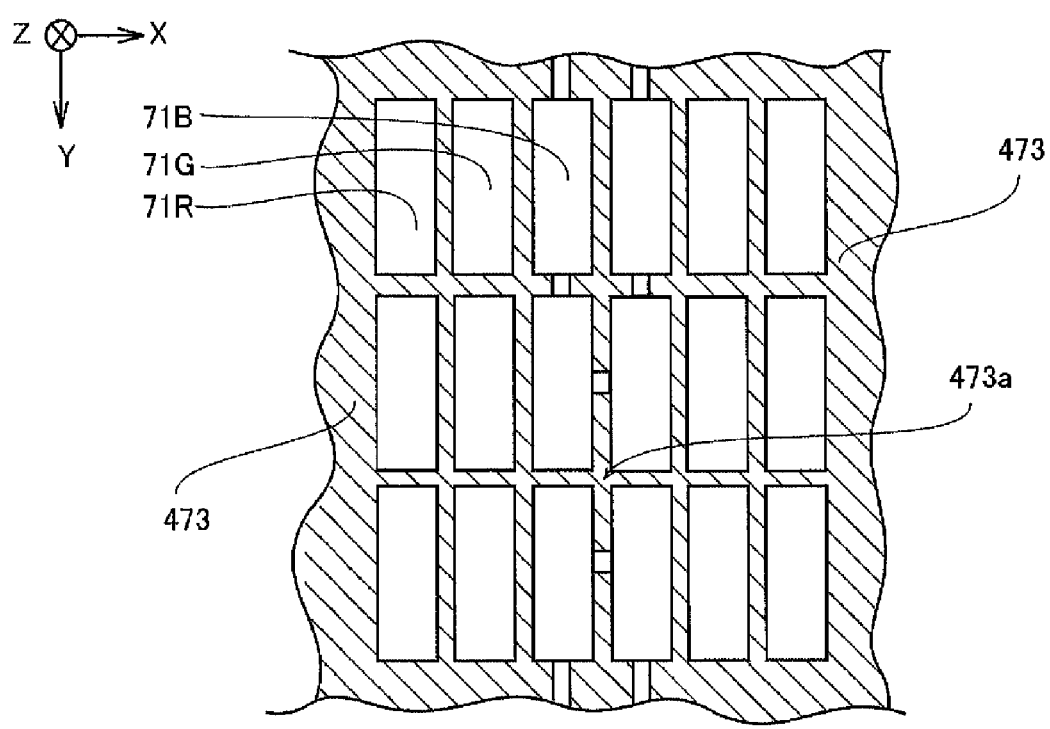
FIG. 18 is a plan view for describing a resistance member according to the fourth embodiment.

FIG. 17 is a schematic plan view illustrating a configuration of a display device 401 according to the fourth embodiment. In addition, FIG. 18 is a plan view for describing a resistance member 473a according to the fourth embodiment. In the fourth embodiment, a reflective member 473 is connected to an adjacent reflective member 473 via the resistance member 473a as illustrated in FIGS. 17 and 18. In addition, the reflective members 473 are segmented similarly to those in the second embodiment. In other words, the reflective members 473 are segmented in accordance with the disposition of touch detection electrodes (not illustrated).

Here, in the case in which the reflective members 473 are segmented in accordance with the disposition of the touch detection electrodes, when electrostatic charge or the like is applied, the charge accumulates in accordance with the shape of the touch detection electrodes 13. It is believed that this charge is likely to cause display abnormalities. Thus, in the fourth embodiment, the resistance member 473a has a resistance value such that a time constant is greater than a time constant corresponding to the drive frequency in touch detection. Thus, because the reflective members 473 are connected to each other by the resistance members 473a having a resistance value that does not increase a load of the touch detection electrodes, it is possible to prevent charge from accumulating. As a result, display abnormalities caused by static electricity or the like can be avoided. Further, other configurations and effects of the fourth embodiment are similar to the configurations and effects of any of the first to third embodiments.

Although the embodiments of the disclosure have been described above, the embodiments described above are merely examples for implementing the disclosure. Thus, the disclosure is not limited to the embodiments described above, and can be implemented by appropriately modifying the embodiments described above without departing from the scope. Now, modified examples of the above-described embodiments will be described.

(1) Although the example in which the black matrices are provided in the display device is introduced in the above-described first to fourth embodiments, the disclosure is not limited to this example. In other words, black matrices may not be necessarily provide in the display device.

(2) Although the example in which the black matrices are formed of different members from the reflective members is introduced in the above-described first to fourth embodiments, the disclosure is not limited to this example. The black matrices may be made of a material having electrical conductivity and capable of reflecting light from the backlight (reflective member).

(3) Although the touch detection electrodes are illustrated in a rectangular shape in the above-described first to fourth embodiments, the disclosure is not limited to this example. In other words, a shape of the touch detection electrodes is not limited to a rectangular shape, and may be a circular shape, a rhombus shape, or the like.

The display device with a touch panel described above can be described as follows.

A display device with a touch panel according to a first configuration is a display device with a touch panel including a backlight and a touch panel configured to display an image using light from the backlight and detect a touch of a user, in which the display device with a touch panel includes a plurality of touch detection electrodes disposed to overlap a display region in which an image is displayed in a plan view and an electrically conductive reflective member disposed closer to the backlight than the plurality of touch detection electrodes, disposed to overlap at least some of the plurality of touch detection electrodes in a plan view of the touch panel, and configured to reflect light from the backlight, and the electrically conductive reflective member is segmented into a plurality of portions in a plan view of the touch panel (first configuration). According to this configuration, the electrically conductive reflective member is segmented into a plurality of portions in a plan view of the touch panel, and thus it is possible to reduce capacitive coupling between the plurality of touch detection electrodes via the electrically conductive reflective member. As a result, even when an electrically conductive reflective member is provided, a CR time constant of the touch detection electrodes (time taken until the touch detection electrodes are charged) can be reduced, and thus touch detection performance can be maintained or improved.

In the first configuration, a plurality of color filters provided in the display region and a black matrix provided between the plurality of color filters in a plan view of the touch panel may be further provided, and the electrically conductive reflective member may be provided on a surface of the black matrix on a side of the backlight (second configuration). According to this configuration, because the reflective member can reflect light radiated to the portion in which the black matrix is provided (the portion in which light is not used for display), light can be more efficiently used.

In the second configuration, at least a part of the boundary of the plurality of segmented electrically conductive reflective members may be provided at a position different from a position of the boundary of the plurality of touch detection electrodes in a plan view of the touch panel (third configuration). Here, in a case in which the reflective members are segmented at a position at which the reflective members overlap the boundary of the touch detection electrodes, while the black matrix is provided at the boundary of the touch detection electrodes, no reflective member is provided. As a result, there may be a portion that does not reflect light in accordance with the boundary of the touch detection electrodes, and thus luminance unevenness is likely to be caused. With respect to this problem, because the boundary of the reflective members is provided at a position different from that of the boundary of the plurality of touch detection electrodes (the position at which the color filters are provided) according to the third configuration, a region in which no reflective member is present in a plan view can be reduced. As a result, luminance unevenness can be curbed.

In any one of the first to third configurations, each of the plurality of segmented electrically conductive reflective members may be connected to a frame part of the touch panel (fourth configuration). According to this configuration, the plurality of reflective members can be easily configured to be connected to each other at the frame part of the touch panel.

In the fourth configuration, each of the electrically conductive reflective members connected to the frame part of the touch panel may be electrically connected to each other at the frame part of the touch panel (fifth configuration). Because the plurality of reflective members are connected by a connection part according to this configuration, local electrification on a transverse electric field-type display panel can be prevented.

In the fourth configuration, each of the electrically conductive reflective members connected to the frame part of the touch panel may be electrically disconnected from each other at the frame part of the touch panel (sixth configuration). Because the reflective members are disconnected from each other according to this configuration, it is possible to further reduce a load of the touch detection electrodes (capacitive coupling between the touch detection electrodes and the reflective members).

In any one of the first to sixth configurations, at least two of the plurality of segmented electrically conductive reflective members may be connected by a resistance member having a resistance value such that a time constant is greater than a time constant corresponding to a drive frequency of the touch panel (seventh configuration). Because the reflective members are connected to each other by the resistance member having a resistance value that does not increase a load of the touch detection electrodes, it is possible to prevent charge from accumulating. As a result, display abnormalities caused by static electricity or the like can be avoided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device with a touch panel comprising:
a backlight; and
a touch panel configured to display an image using light from the backlight and detect a touch of a user,
wherein the display device with a touch panel includes a plurality of touch detection electrodes disposed to overlap a display region in which the image is displayed in a plan view and an electrically conductive reflective member disposed closer to the backlight than the plurality of touch detection electrodes, disposed to overlap at least some of the plurality of touch detection electrodes in a plan view of the touch panel, and configured to reflect light from the backlight, and
the electrically conductive reflective member is segmented into a plurality of portions in a plan view of the touch panel.

2. The display device with a touch panel according to claim 1, further comprising:
a plurality of color filters provided in the display region; and
a black matrix provided between the plurality of color filters in a plan view of the touch panel,
wherein the electrically conductive reflective member is formed on a surface of the black matrix on a side of the backlight.

3. The display device with a touch panel according to claim 2,
wherein at least a part of a boundary of the plurality of electrically conductive reflective members that are segmented is provided at a position different from a position of a boundary of the plurality of touch detection electrodes in a plan view of the touch panel.

4. The display device with a touch panel according to claim 1,
wherein each of the plurality of electrically conductive reflective members that are segmented is connected to a frame part of the touch panel.

5. The display device with a touch panel according to claim 4, wherein the electrically conductive reflective members connected to the frame part of the touch panel are electrically connected to each other at the frame part of the touch panel.

6. The display device with a touch panel according to claim 4,
wherein the electrically conductive reflective members connected to the frame part of the touch panel are disposed in a state of being electrically disconnected from each other at the frame part of the touch panel.

7. The display device with a touch panel according to claim 1,
wherein at least two of the plurality of electrically conductive reflective members that are segmented are connected by a resistance member having a resistance value such that a time constant is greater than a time constant corresponding to a drive frequency of the touch panel.

* * * * *